Nov. 14, 1933.  L. A. WELLINGTON  1,935,493
TOOL HOLDER
Filed March 26, 1929   2 Sheets-Sheet 2
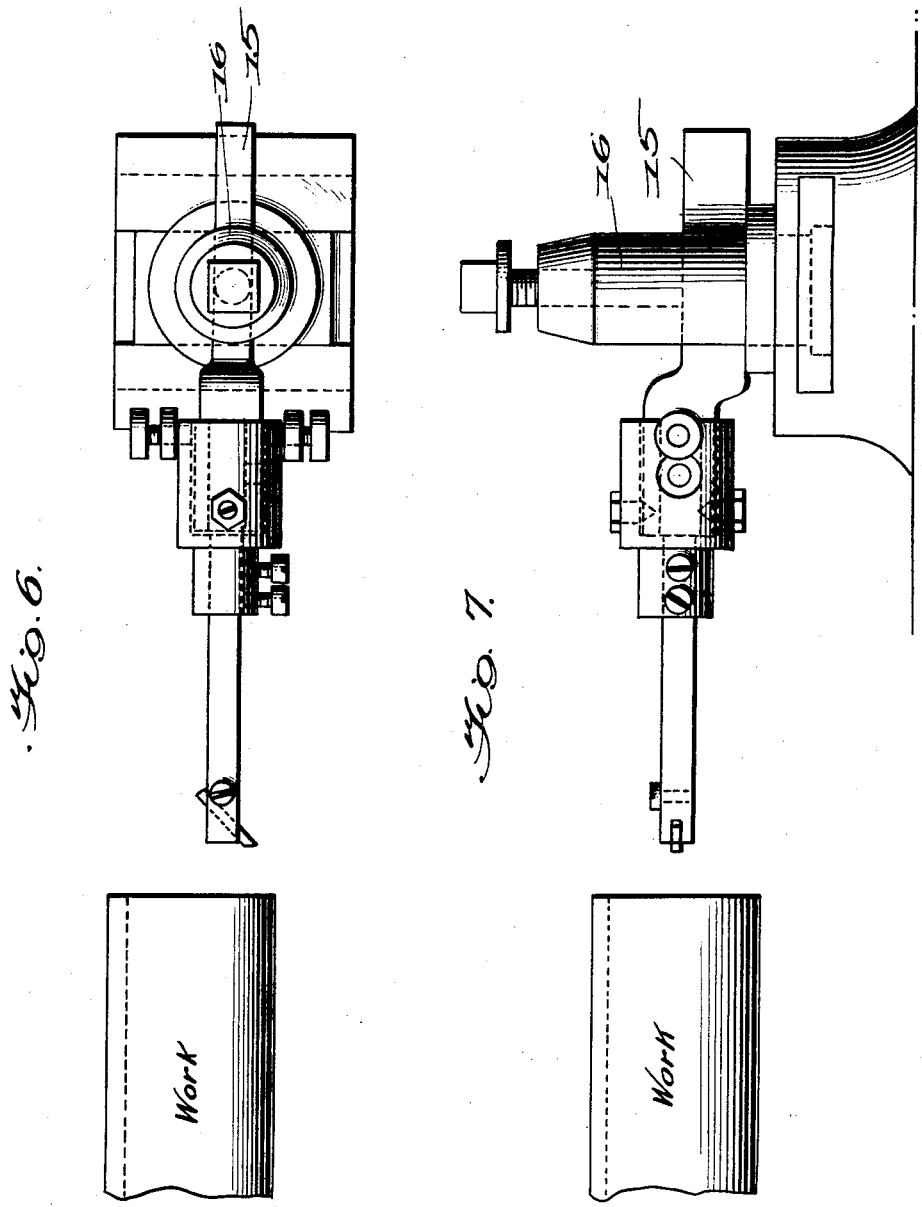
Inventor
Leonard A. Wellington
By Vernon E. Hodges
his Attorney Patented Nov. 14, 1933

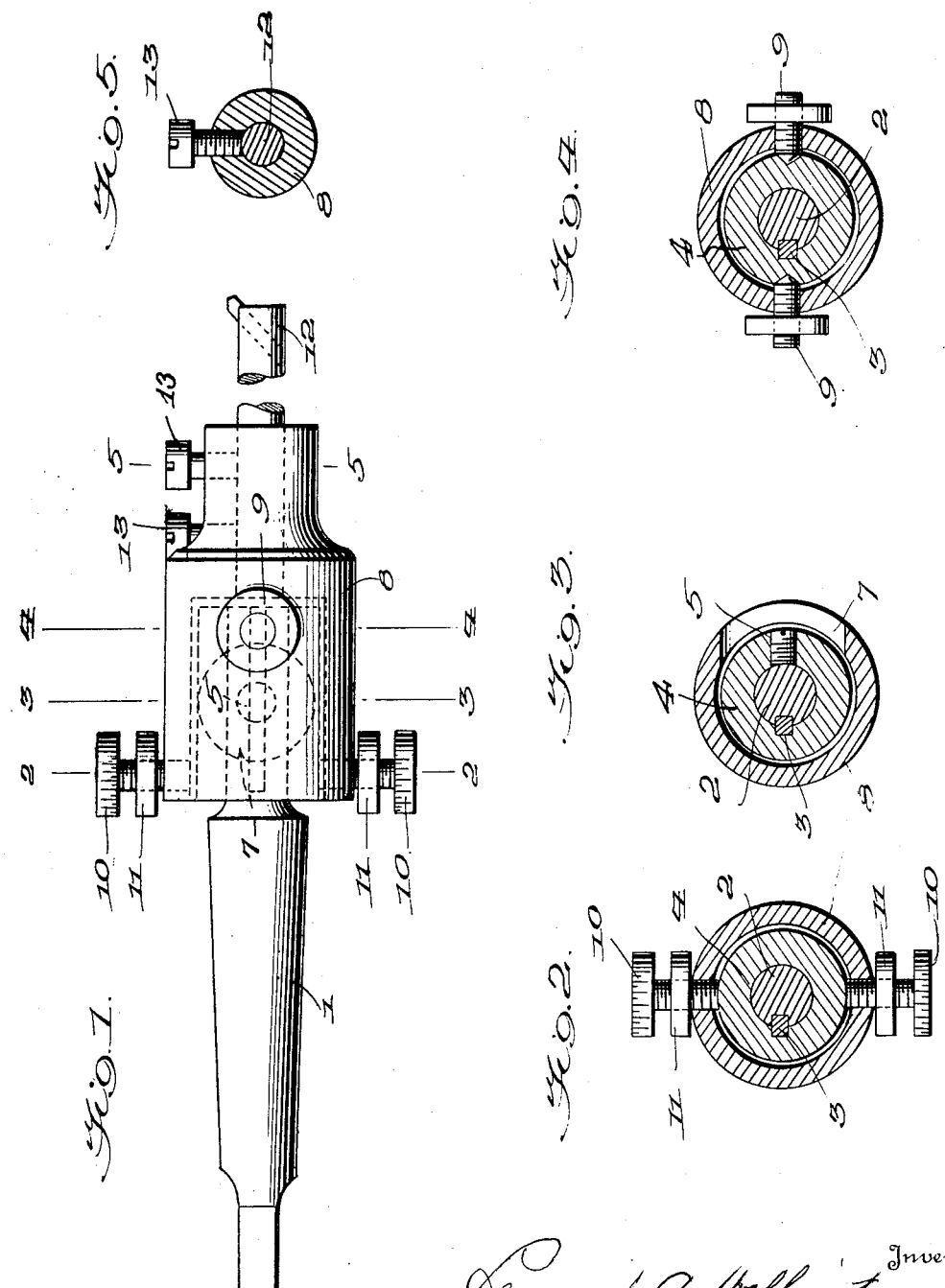

1,935,493

UNITED STATES PATENT OFFICE 1,935,493

TOOL HOLDER

Leonard A. Wellington, Keene, N. H.

Application March 26, 1929. Serial No. 350,034

3 Claims. (Cl. 279—6)

My invention relates to an improvement in tool holders in which the tool-holder may be adjusted to produce some predetermined size and to be able to remove said tool and again replace the same and at the same time to produce the same size or results as hitherto.

In the arts, especially the mechanical, it is frequently necessary to produce duplicate work of a certain size or diameter on the so-called manufacturing basis. This cannot be done satisfactorily with one operation or "cut", and two or more "cuts" or operations are necessary to produce satisfactory results, according to the amount of stock to be removed or other contingencies. When there is a repetition of these operations of the same size or dimensions, it will be seen that there will be many adjustments necessary when tools that are now in use are used. It is also impracticable to use the same cutting tool for the so-called roughing and finishing operations, especially in cast-iron, on account of the wear, etc., and also it is frequently necessary to sharpen the tools differently to obtain the best results, according to the materials that are "worked".

It is also possible to have tools preadjusted so that when one becomes dull or not capable of producing perfect work it may be removed and another substituted and results accomplished that otherwise would be accomplished only by a skilled workman.

In the accompanying drawings:

Fig. 1 is a side elevation of one form of the invention;

Fig. 2 is a transverse sectional view on the line 2—2 of Fig. 1;

Fig. 3 is a similar view on the line 3—3 of Fig. 1;

Fig. 4 is a similar view on the line 4—4 of Fig. 1;

Fig. 5 is a similar view on the line 5—5 of Fig. 1;

Fig. 6 is a plan view of the holder used in a slightly different manner; and,

Fig. 7 is a side elevation of the same.

Referring to Figs. 1 to 5 of the drawings, there is what is called a shank. This is shown in Fig. 1 at 1. In this case it is tapered to fit a milling or boring machine, but it may be of any convenient shape to insure rigidity and reasonable concentricity. This is carried out on the opposite end to a straight or slightly tapered end 2, as the case may be, and is provided with a key 3 to prevent slippage, and also to insure replacement to the same position. Fitted to slip over the key 3 and shank 2 is the sleeve 4, which is also fastened to the shank 2 by a screw 5 in addition to the key as shown in Fig. 3 on the right. The head 8 is cut away as at 7 so as to allow ready access to this screw.

Fitted over sleeve 4 is a head 8. This head is carried on the sleeve 4 by pivot screws 9—9 as shown in Fig. 4, and is adjustable on these pivot-screws 9—9 by the screws 10—10 arranged at right-angles thereto as shown in Fig. 1, and capable of being locked by the lock-nuts 11 in any required position. In the outer end of the head 8 is secured the boring tool 12, which may be of any convenient size or shape for the work intended to be done. This is fastened in place with the two screws 13 as shown.

It will be readily seen that sleeve 4 slides onto the end 2 of shank 1, and that head 8 is rigidly pivoted on the sleeve 4 by the pivot-screws 9, and is adjustable by the screws 10 (in Fig. 2) moving the boring tool radially as may be necessary to increase or decrease the effective cutting radius thereof and to accomplish the desired result.

It will be further seen that one purpose of the entire device is that the shank 1 is to remain in position (in the machine) during the entire use of the device.

It will be further seen that with this manner of construction it would be possible to have several of these heads capable and fitted to be readily placed on the straight or tapered end 2 of the shank 1. They may be adjusted, each to the size that is to be produced and keep them to that size until all of the holes have been produced of that size.

In the arrangement shown in Figs. 6 and 7, the holder is shown applied to a tool which is mounted stationary, and is used where the work revolves. The shank 15 is held in a tool-post 16 or other suitable support therefor, and the head and tool are held and adjusted in the same manner as above described. In this instance, the work revolves relative to the tool to accomplish the boring or cutting operations.

By this invention it is possible to use separate tools which may be pre-adjusted for the different cuts of the work that may be necessary or desirable, or the tools may be capable of adjustment to the desired size, and, being adjusted, may be substituted for others incapable of efficient use.

In other words, with this invention the mounting of the different units is such that they may be inserted or so placed in the operating position as to be used, removed, and replaced as occasion may arise. Any form of cutting- or boring-tool may be used in connection with the invention.

I claim:

1. A tool holder comprising a supporting shank, a sleeve removably fitted over an end of the shank, a head surrounding the sleeve in axial alignment with the shank, a cutting tool removably carried by the head, pivotal means supporting the head on the sleeve to swing the head out of axial alignment with the shank and change the cutting radius of the tool, and means carried by the head and engaging the sleeve for holding the head in an adjusted position.

2. A tool holder comprising a supporting shank constructed to be received in a tool support, a sleeve removably mounted on the shank, a tool supporting head extending over the sleeve to be supported thereby, a tool removably received and supported by the outer end of the head, pivots projecting inwardly from opposite sides of the head adjacent the end thereof supporting the tool and engaging the sleeve for pivotally supporting the head thereon, and an adjusting screw connected with the head and engaging the sleeve at the opposite end of the head from the tool for adjusting the head on the pivots.

3. A tool holder comprising a supporting shank constructed to be received in a tool support, a sleeve removably mounted on the shank, a set-screw holding the sleeve on the shank, a tool supporting head extending over the sleeve to be supported thereby and having a side opening therein in position to gain access to the set screw, a tool removably supported by the outer end of the head, pivot screws projecting inwardly from opposite sides of the head adjacent the end thereof supporting the tool and engaging the sleeve for pivotally supporting the head thereon, and an adjusting screw connected with the head at the opposite end thereof from the tool and engaging the sleeve for adjusting the head on the pivot screws.

LEONARD A. WELLINGTON.